(12) United States Patent
Reehil (10) Patent No.: US 11,481,441 B2
(45) Date of Patent: Oct. 25, 2022

(54) GRAPH DATABASE QUERY PAGINATION

(71) Applicant: AT&T Intellectual Property I, L.P., Atlanta, GA (US)

(72) Inventor: William Reehil, Jackson, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 452 days.

(21) Appl. No.: 16/395,443

(22) Filed: Apr. 26, 2019

(65) Prior Publication Data
US 2020/0342027 A1    Oct. 29, 2020

(51) Int. Cl.
*G06F 16/901* (2019.01)
*G06F 7/08* (2006.01)
*G06F 16/9038* (2019.01)

(52) U.S. Cl.
CPC ........... *G06F 16/9024* (2019.01); *G06F 7/08* (2013.01); *G06F 16/9027* (2019.01); *G06F 16/9038* (2019.01)

(58) Field of Classification Search
CPC ............. G06F 16/9024; G06F 16/9038; G06F 16/9027
See application file for complete search history.

(56) References Cited

U.S. PATENT DOCUMENTS

| | | | | |
|---|---|---|---|---|
| 6,735,548 | B1* | 5/2004 | Huang | H04L 41/12 702/179 |
| 2011/0093500 | A1* | 4/2011 | Meyer | G06F 16/972 707/774 |
| 2014/0067781 | A1* | 3/2014 | Wolchok | G06F 16/9024 707/701 |
| 2015/0063102 | A1* | 3/2015 | Mestery | H04L 41/50 370/230 |
| 2017/0177681 | A1* | 6/2017 | Potiagalov | G06F 16/26 |
| 2017/0293593 | A1* | 10/2017 | Cowie | G06F 16/9574 |
| 2018/0129716 | A1* | 5/2018 | Su | G06F 16/248 |

* cited by examiner

*Primary Examiner* — James Trujillo
*Assistant Examiner* — J Mitchell Curran (57) ABSTRACT

A processing system of including at least one processor may obtain a query to retrieve a set of information from a graph database, the query providing a criterion for identifying graph database vertices that are relevant to the query, identify the graph database vertices that are relevant to the query in accordance with the criterion, obtain vertex identifiers of the relevant vertices, sort the vertex identifiers into a list in a sequential order, identify a first subset of the vertex identifiers in the list that corresponds to a first result index and a result size, access a first subset of the vertices that is identified as being relevant to the query and that is identified by the first subset of the vertex identifiers, retrieve a first subset of the set of information from the first subset of the vertices, and provide the first subset in a first results page.

20 Claims, 5 Drawing Sheets

EXAMPLE OF CHUNK/PAGE SIZE = 2

GRAPH DATABASE QUERY PAGINATION

The present disclosure relates generally to network inventory databases, and more particularly to methods, computer-readable media, and apparatuses for providing paginated results for a graph database query.

BACKGROUND

Graph databases are useful for structuring large amounts of interconnected data and provide flexibility to impose rules on relationships and attributes. In some cases, data may be structured in a tree-based graph. For instance, this approach may be useful when the data has hierarchical relationships. The ability to easily and efficiently retrieve data from graph databases is important as these data structures gain popularity.

SUMMARY

Methods, computer-readable media, and apparatuses for providing paginated results for a graph database query are described. For instance, in one example, a processing system including at least one processor may obtain a query to retrieve a set of information from a graph database, the query providing at least one criterion for identifying vertices in the graph database that are relevant to the query, identify the vertices in the graph database that are relevant to the query in accordance with the at least one criterion, obtain vertex identifiers of the vertices that are identified as being relevant to the query, sort the vertex identifiers into a list in a sequential order, and identify a first subset of the vertex identifiers in the list that corresponds to a first result index and a result size. The processing system may further access a first subset of the vertices in the graph database that is identified as being relevant to the query and that is identified by the first subset of the vertex identifiers, retrieve a first subset of the set of information from the first subset of the vertices, and provide the first subset of the set of information in a first results page.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Graph databases are well suited to structuring large amounts of interconnected data, and provide flexibility to impose rules on relationships and attributes. In some cases, data may be structured in a tree-based graph. For instance, this approach may be useful when the data has hierarchical relationships. The ability to easily and efficiently retrieve data from graph databases is important as these data structures gain popularity. However, some queries may result in long response times. In addition, systems may be overwhelmed by the volume of the retrieved data.

Examples of the present disclosure chunk larger graph traversals into a series of sub graph traversals by first identifying an inventory of presorted start vertices. These vertices are initially sorted according to a designated criterion. The list is then split into chunks, or pages, of a designated number of start vertices. By speeding up performance on database inventory browsing interactions (e.g., queries), users are able to be less specific in their queries, while still being able to crawl graph database information efficiently. For example, this approach may be implemented to assist users in browsing the entirety of an active and available inventory (A&AI) topology of a telecommunication network via a graphical user interface (GUI). For instance, traversals may be chunked into sets of 50 vertices per page, 100 vertices per page, etc.

In one example, the present disclosure indexes vertex identifiers (IDs) of vertices in a graph database. In response to a query from a client, the present disclosure may initially pull a set/list of starting vertices, e.g., arranged by index IDs. If a client requests a total number of results, all the vertices' indexed vertex IDs may be retrieved. Alternatively, or in addition, if a total number of results is not requested, a subset of the nodes/vertices may be pulled (at the level in which they reside). To illustrate, the present disclosure may pull a pre-sorted on-disk list of vertex IDs and may group the starting vertex IDs into subsets by pulling from the list of vertex IDs as follows: FROM: (chunk index−1)*chunk size TO: MIN(chunk size*chunk index, total vertices), where the chunk size is the size of the subset of vertices (e.g., the page size), and where the chunk index is the desired page, e.g., out of a total number of pages/subsets in accordance with the chunk size/page size. This may provide a subset of vertices to start graph traversals from, e.g., to get all relationships and associated attributes in accordance with the received query, and for a given page/chunk identified by the chunk index. The results for the current chunk/page may then be pulled via graph traversal and provided to the client. In one example, the values for chunk size and chunk index may be provided by the client as part of or in connection with the query. The current chunk index, chunk size, and/or total chunks/results may also be returned to the client for ease of use. Results pagination for graph database queries may be used in connection with any user interface (e.g., a graphical user interface (GUI)) requesting data, since users are sensitive to waiting for results to be returned, or any client that is concerned with performance or response size and can handle receiving results in chunks.

Providing the ability to pull a subset of all results of a graph traversal provides for scalability and performance improvements. For example, a GET ALL type query may take up to 10 minutes to return the results. However, with paginated results, a page with 50 vertices may be returned in around 2 seconds, for instance. By returning results in chunks, this allows for quicker response times, less constant resource load on servers (e.g., by avoiding tying up a thread for an extended period of time) and provides more manageable amounts of data. Thus, the present disclosure provides easily digestible chunks of data from a big data, graph database, which is useful to clients desiring fast results and not being overwhelmed by the response size.

In one example, the present disclosure provides for configurability by the client to set page/chunk size, to determine when to pull additional information for a next page/chunk, and so forth. In one example, the present disclosure may also provide multithreading of graph traversals to speed up queries, e.g., when more compute resources are available. For instance, different processors, different cores, different servers, etc., may be tasked with traversing the graph database in connection with different chunks/pages. These and other aspects of the present disclosure are discussed in greater detail below in connection with the examples of FIGS. 1-5.

Figure 1:
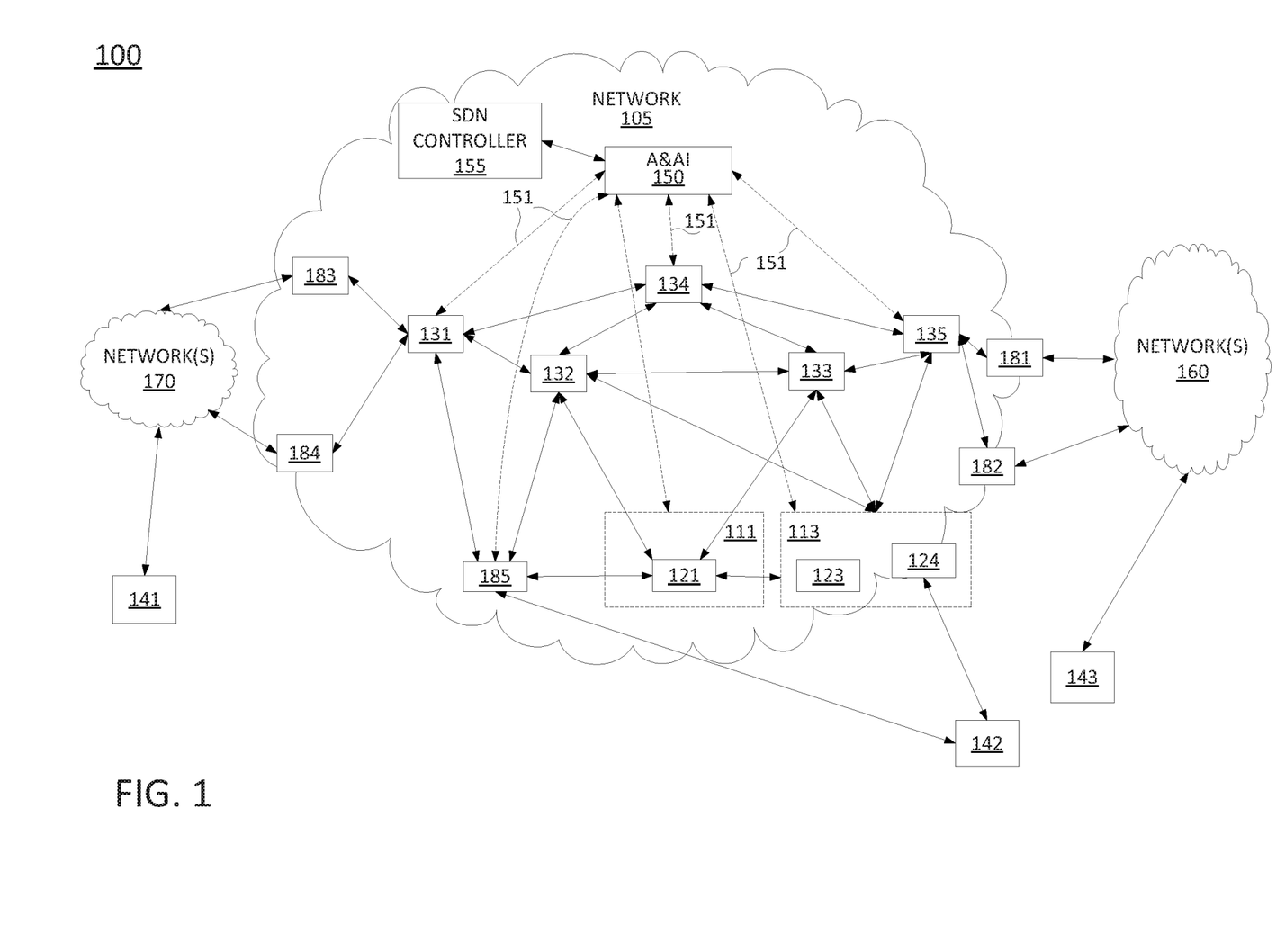
FIG. 1 illustrates an example system related to the present disclosure.

To aid in understanding the present disclosure, FIG. 1 illustrates a block diagram depicting one example of a communications network or system 100 for performing or enabling the steps, functions, operations, and/or features described herein. The system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/multi-protocol label switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth. In one example, the network 105 uses a network function virtualization infrastructure (NFVI), e.g., servers in a data center or data centers that are available as host devices to host virtual machines (VMs) comprising virtual network functions (VNFs). In other words, at least a portion of the network 105 may incorporate software-defined network (SDN) components.

In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may each comprise a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from user devices 141-143. For instance, the traffic may relate to communications such as voice telephone calls, video and other multimedia, text messaging, emails, and so forth among the user devices 141-143, or between the user devices 141-143 and other devices that may be accessible via networks 160 and 170. User devices 141-143 may comprise, for example, cellular telephones, smart phones, personal computers, other wireless and wired computing devices, private branch exchanges, customer edge (CE) routers, media terminal adapters, cable boxes, home gateways and/or routers, and so forth.

In accordance with the present disclosure, user devices 141-143 may communicate with or may communicate via network 105 in various ways. For example, user device 141 may comprise a cellular telephone which may connect to network 105 via network 170, e.g., a cellular access network. For instance, such an example network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on a network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, a Simple Network Management protocol (SNMP) trap, etc., and unit 124 may be configured to be a PE router, e.g., a virtual provide edge (VPE) router, which may provide connectivity to network 105 for user devices 142 and 143. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., configured/programmed via computer-readable/computer-executable instructions, code, and/or programs) to provide for load balancing between two processors and several line cards that may reside on separate host devices.

In one example, network 105 may also include an additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a call control element (CCE), a media server, a domain name service (DNS) server, a packet data network gateway (PGW), a gateway mobile switching center (GMSC), a short message service center (SMSC), etc.

Figure 5:
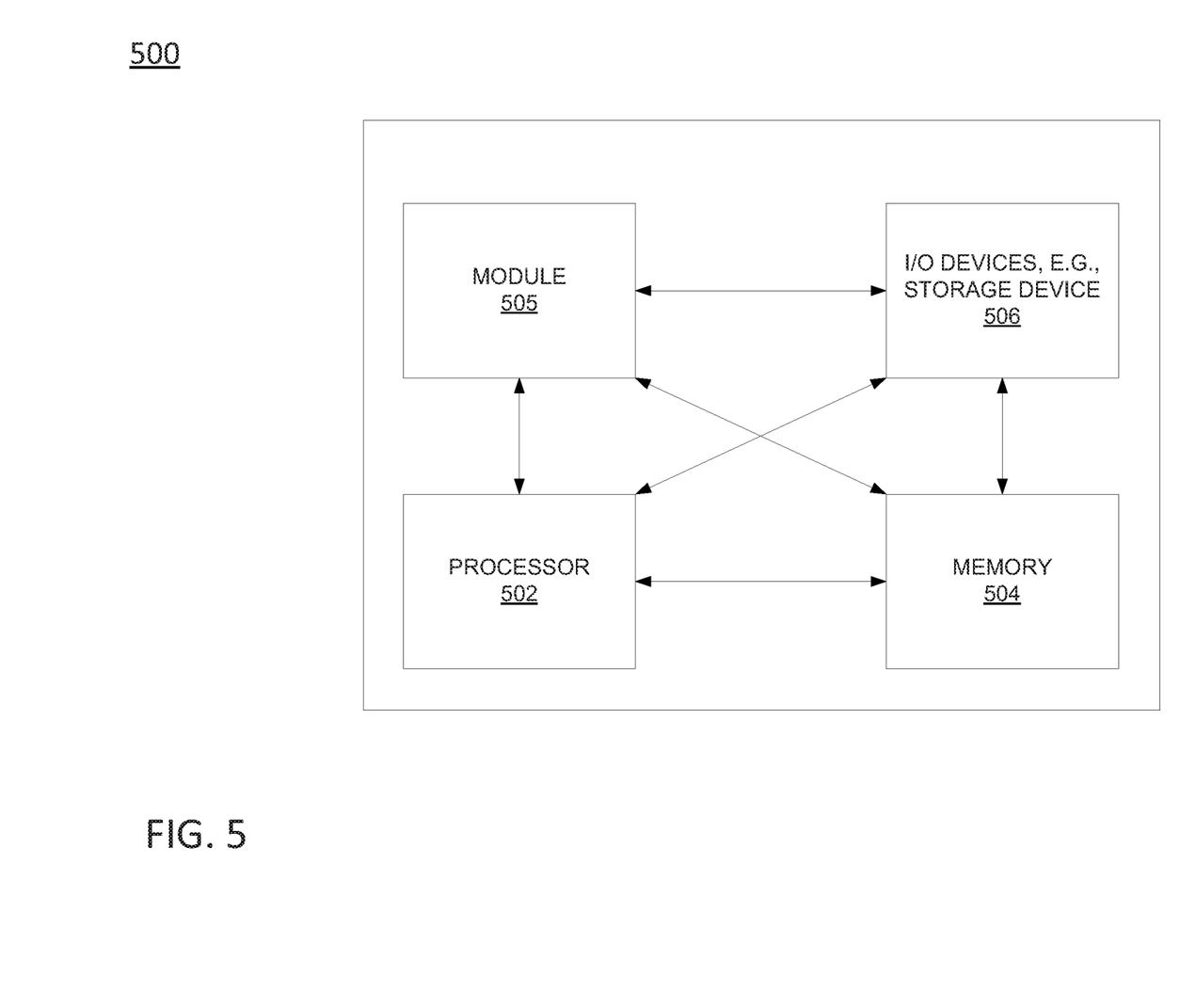
FIG. 5 illustrates a high level block diagram of a computing device specifically programmed to perform the steps, functions, blocks and/or operations described herein.

As further illustrated in FIG. 1, network 105 includes a software defined network (SDN) controller 155. In one example, the SDN controller 155 may comprise a computing system or server, such as computing system 500 depicted in FIG. 5, and may be configured to provide one or more operations or functions in connection with examples of the present disclosure for providing paginated results for a graph database query. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 5 and discussed below) or multiple computing devices collectively configured to perform various steps, functions, and/or operations in accordance with the present disclosure.

In one example, NFVI 111 and unit 121, and NFVI 113 and units 123 and 124 may be controlled and managed by the SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

The functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "configuration code") for units 123 and 124 respectively, which when executed by a processor of the NFVI 113, may cause the NFVI 113 to perform as a PE router, a gateway, a route reflector, a SGW, a MME, a firewall, a media server, a DNS server, a PGW, a GMSC, a SMSC, a CCE, and so forth. In one example, SDN controller 155 may download the configuration code to the NFVI 113. In another example, SDN controller 155 may instruct the NFVI 113 to load the configuration code previously stored on NFVI 113 and/or to retrieve the configuration code from another device in network 105 that may store the configuration code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As illustrated in FIG. 1, network 105 may also include internal nodes 131-135, which may comprise various components, such as routers, switches, route reflectors, etc., cellular core network, IMS network, and/or VoIP network components, and so forth. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., PE routers interfacing with networks 160, and component 185, e.g., a PE router which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers interfacing with network(s) 170, e.g., for non-cellular network-based communications. In one example, components 181-185 may also comprise VNFs hosted by and operating on additional NFVI. However, in another example, at least a portion of the components 181-185 may comprise dedicated devices or components.

In one example, network 105 further includes an active and available inventory (A&AI) system 150. The A&AI system 150 may comprise a computing system or server, such as computing system 500 depicted in FIG. 5, and may be configured to provide one or more operations or functions in connection with examples of the present disclosure for providing paginated results for a graph database query. For instance, A&AI system 150 may obtain network topology information (e.g., connectivity information), as well as services and resources information for various physical and virtual components of network 105 and/or networks 160, 170, etc. (e.g., any of internal nodes 131-135, components 181-185, units 121, 123, and 124, NFVI 111 and 113, and so forth). The data gathered and stored by A&AI system 150 may be obtained from various devices in the network 105. For instance, the devices may send attributes and connectivity information to A&AI system 150, or any one or more of internal nodes 131-135, components 181-185, units 121, 123, and 124, NFVI 111 and 113, and so forth may comprise aggregation points for collecting attributes and connectivity information, and forwarding the attributes and connectivity information to A&AI system 150.

In one example, the A&AI system 150 may store gathered information in a graph database. In one example, the graph database may be constructed and maintained by the A&AI system 150 in accordance with a schema, e.g., a set of rules regarding the types of nodes/vertices in the graph database, the attributes of the nodes/vertices, the types of relationships between nodes/vertices, the types of properties and labels that may be associated with nodes/vertices and the relationships. The schema may also be defined to imply a hierarchy of nodes/vertices. For instance, nodes/vertices may be arranged in layers/levels, such as cloud regions, rack tenants, physical servers, and virtual machines (VMs) (such as VNFs), where rack tenants may be child nodes/vertices of cloud regions, physical services may be child nodes/vertices of rack tenants, and so forth. Thus, for example, when a new VNF is instantiated at NFVI 111 (e.g., as node 121) by SDN controller 155, the A&AI system 150 may receive notification of the new VNF. For instance, the notification may come from NFVI 111, from SDN controller 155, or both.

The A&AI system 150 may then create a new vertex in the graph database for the VNF and add the vertex in the appropriate position in the graph database. For example, the vertex for the VNF (node 121) may be added as a child of a vertex for the NFVI 111 (e.g., a physical server) in accordance with the schema. For instance, an edge between the vertex for the NFVI 111 and the vertex for the VNF (node 121) may include the label "is child of" or "is hosted on." The A&AI system 150 may perform similar operations to remove nodes/vertices and edges (e.g., when a VNF is released, when a physical server is removed from service, etc.), to update edges, e.g., when two physical servers in operation obtain a new connection, when a bandwidth between physical servers is increased, etc., to update nodes, e.g., when additional memory, processor resources, storage resources, or the like are added or when such resources are removed, and so on. In addition, it should be noted that when adding a new vertex to the graph database, the A&AI system 150 may sequentially assign a vertex ID to the vertex. Thus, each vertex may have a unique identifier.

In addition to constructing and maintaining such a graph database, the A&AI system 150 may also process client queries over the graph database. For instance, clients may include user devices, such as personal computers, cloud-based user desktop applications, or automated components of network 105 (comprising physical devices or services/applications running on physical devices), such as SDN controller 155, a billing system, a network provisioning system, a network security system, etc. In one example, the A&AI system 150 may provide paginated results for a graph database query, e.g., in accordance with the method 400 of FIG. 4. For example, a user, such as network operations personnel may initiate a query via user device 141. In one example, the A&AI system 150 may create and/or store vertex indexes arranged by vertex ID, e.g., automatically as configured by an operator of the A&AI system and/or in response to a client request. For instance, A&AI system 150 may maintain an index of vertex IDs for all cloud regions, an index of vertex IDs for all physical servers, an index of vertex IDs for all VMs of a particular type, an index of vertex IDs for all physical servers in a cloud region, and so forth. Alternatively, or in addition, A&AI system 150 may perform an initial traversal of the graph database to create an index in connection with a client request to obtain paginated results for a query. These and additional functions that may be performed by A&AI system 150 and/or SDN controller 155 are described in greater detail below in connection with the examples of FIGS. 2-4.

It should be noted that the system 100 has been simplified. In other words, the system 100 may be implemented in a different form than that illustrated in FIG. 1. For example, the system 100 may be expanded to include additional networks, such as a network operations center (NOC) network, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. In still another example, SDN controller 155, A&AI system 150, and/or other network elements may comprise functions that are spread across several devices that operate collectively as a SDN controller, an A&AI system, an edge device, etc. Thus, these and other modifications of the system 100 are all contemplated within the scope of the present disclosure.

In addition, it should be noted that examples are described herein in connection with a graph database for an A&AI system of a telecommunication network. However, the principles set forth herein may be equally applied to graph database systems storing various other types of information, such as a graph database representing a transportation system, e.g., for road, ocean, and/or rail transit, a graph database system representing an organizational structure, e.g., of a corporation/business, of an educational institution, etc., a graph database system representing an environmental ecosystem, and so forth.

Figure 2:
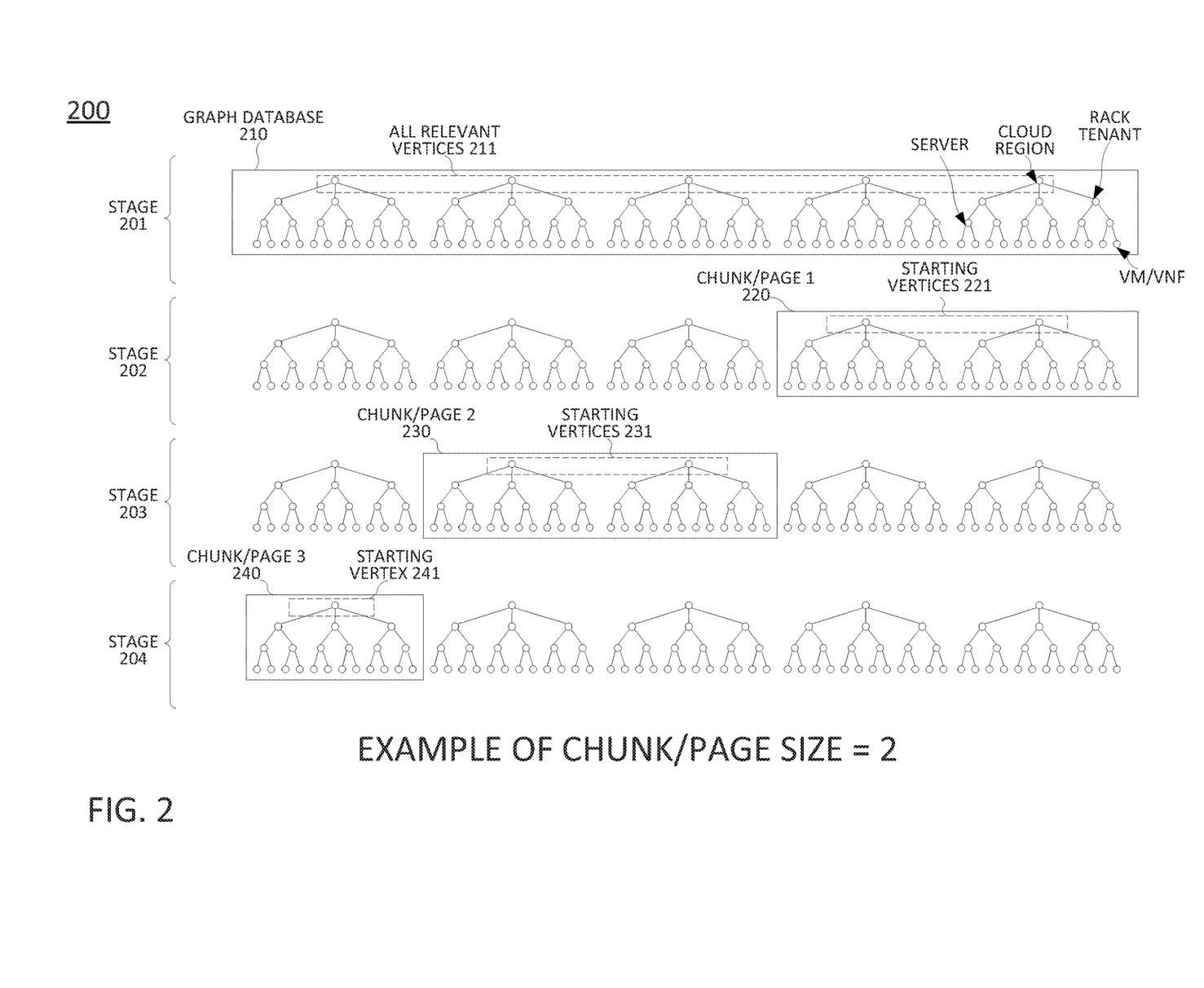
FIG. 2 illustrates an example process of providing paginated results for a graph database query.

FIG. 2 illustrates an example process 200 of providing paginated results for a graph database query relating to a graph database 210. For instance, the process 200 may describe an example where a graph database system receives a query for a "GET ALL" from parent nodes of the graph database 210. In the present example, the graph database system may comprise an A&AI system of a telecommunication network and the graph database 210 may include parent nodes for "cloud regions" with child nodes for "rack tenants" and subsequent levels for "servers" and "VMs/VNFs" (virtual machines/VNFs).

In the present example, at stage 201, the graph database system may first identify a set of all relevant vertices 211 in the graph database 210 (where the vertices 211 are determined to be "relevant" to the query in accordance with at least one criterion contained in the query, e.g.: "GET ALL https://{{hostname}}:{{port}}/aai/{{version}}/cloud-infrastructure/cloud-region." In one example, the graph database system may retrieve an index, or list of the relevant vertices 211, arranged by vertex ID. Alternatively, or in addition, the graph database system may perform an initial traversal of the graph database to identify the vertex IDs of all relevant vertices 211 (e.g., all vertices having a label/type of "cloud region").

To illustrate, in one example, the graph database of the present disclosure may comprise a TinkerPop graph database which may utilize a storage backend such as Apache Cassandra, ArangoDB, Berkeley DB, etc. In one example, the graph database is a JanusGraph database which is TinkerPop compliant. In such an example, the initial traversal may comprise a command via the Gremlin query language to pull the vertex IDs of all vertices of the relevant type (e.g., "cloud-region"). Other graph databases and graph database systems (e.g., the tools to create, query, and manage a graph database, as well as the graph database itself) of the same or a similar nature may be utilized in connection with examples of the present disclosure (such as Titan, Neo4j, etc., as well as other components, such as storage backends).

In one example, the client may specify a page size as part of the query or in connection with the query. In one example, the graph database system may provide the total number of the relevant vertices 211 to the client. The client may then provide a selection of a chunk/page size, e.g., after considering the total number of the relevant vertices 211. In another example, the page size may be set by a provider or operator of the graph database system. Alternatively, or in addition, the graph database system may impose a maximum page size, where the client may provide a selection of a page size that does not exceed such a maximum. In the present case, the page size may be two (e.g., two vertices or presented as two vertex IDs). In one example, each of the vertices in the set of relevant vertices 211 is identified by a vertex ID, where the set of relevant vertices 211 may be arranged in an ordered/sequential list by vertex ID.

At stage 202, the graph database system may traverse the graph database 210 in accordance with starting vertices 221 of a first chunk/page 220. In one example, the graph database system may automatically proceed to stage 202 following stage 201 (e.g., if the chunk/page size is known). Alternatively, the graph database system may proceed to stage 202 in response to an input from the client, such as a click of a button or a similar input via a GUI, via a keyboard entry, via a voice command, etc. to indicate that the client (or user) is ready for the first page of results. In one example, the client may specify a page size and a desired page (or index number). For instance, in the present example, the client may request results for the first chunk/page 220 with a chunk/page size of two. Accordingly, there are two starting vertices 221 based upon the chunk/page size of two.

To illustrate, the graph database system may start at each of the starting vertices 221 and traverse down through three levels to pull all vertices, attributes, and relationships below each of the starting vertices 221. For example, the graph database system may pull the starting vertices 221 from the set of relevant vertices 211 by vertex ID. To illustrate, if the page/chunk size is two and the first chunk/page 220 is selected, the graph database system may pull the first two vertex IDs from the set of relevant vertices 211. Traversing from each starting vertex of the starting vertices 221 may result in identification of a cloud region, the attributes of the cloud region (e.g., a geographic indicator, a health status indicator, etc.), the rack tenants, physical servers, and VMs/VNFs deployed in and/or operating in each cloud region, the statuses of these components, the relationships between these components (e.g., a particular vMME is deployed in a particular server and is supporting a set of vSGWs which are deployed at particular other physical servers, and so forth), the number of subscribers supported by these components, and so on. In one example, stage 202 may include returning to the client and/or presenting at the client (e.g., via a GUI) a set of information obtained from traversing the graph database 210 from the starting vertices 221.

At stage 203, the graph database system may perform similar operations regarding a second chunk/page 230. In one example, the graph database system may proceed to stage 203 in response to an input from the client. For instance, a user at the client may review the set of information provided in connection with the first chunk/page 220 and may then click a button or provide a similar input via a GUI, via a keyboard entry, via a voice command, etc. to indicate that the user is ready for a next page of results. In response, the graph database system may pull the starting vertices 231 from the set of relevant vertices 211 by vertex ID. To illustrate, if the page/chunk size is two and the second chunk/page 230 is selected, the graph database system may pull the third and fourth vertex IDs from the set of relevant vertices 211. The graph database system may then start at each of the starting vertices 231 and traverse down through three levels to pull all vertices, attributes, and relationships below each of the starting vertices 231. In one example, stage 203 may include returning to the client and/or presenting at the client (e.g., via a GUI) a set of information obtained from traversing the graph database 210 from the starting vertices 231.

At stage 204 the graph database system may proceed to retrieve results for the third chunk/page 240. In one example, the graph database system may proceed to stage 204 in response to an input from the client. Since, chunk/page 240 is the last page and since there is an odd total number of relevant vertices 211, the chunk/page 240 includes a single starting vertex 241. The graph database system may begin at the starting vertex 241 and traverse down through three levels to pull all vertices, attributes, and relationships below the starting vertex 241. In one example, stage 204 may include returning to the client and/or presenting at the client (e.g., via a GUI) a set of information obtained from traversing the graph database 210 from the starting vertex 241.

The foregoing describes an example where the client requests pages/chunks in order. However, it should be noted that the client may also provide an input to indicate that a particular page of results is desired, without regard to the page of results that is most recently (or currently) obtained and/or presented. For instance, the client may request the results for the third chunk/page 230 prior to and/or instead of the results for the second chunk/page 220, may request a "last" page of results prior to and/or instead of results for pages which sequentially precede the last page, and so forth.

Figure 3:
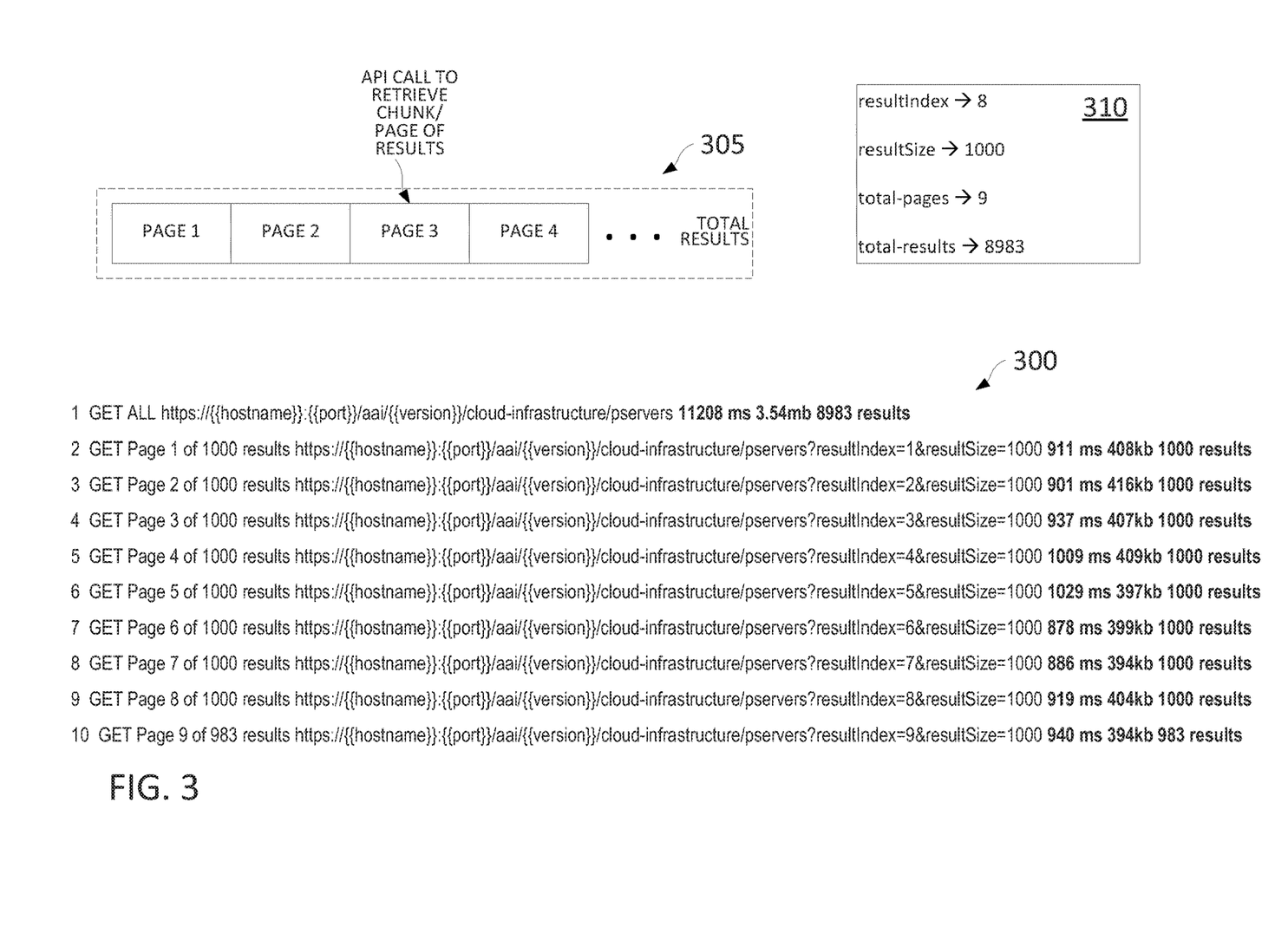
FIG. 3 illustrates an example of client queries to a graph database system to obtain paginated results.

FIG. 3 illustrates an example of client queries to a graph database system to obtain paginated results. For example, FIG. 3 illustrates a query sequence 300. The query sequence 300 includes a GET ALL query in line 1 which requests information regarding physical servers ("pservers") supporting cloud infrastructure of a telecommunication network. In this example, the query takes 11208 ms to complete and returns 8983 results (starting vertices) with a total data volume of 3.54 Mb. Lines 2-10 include queries, or requests for respective pages of results (e.g., for pages 1-9). Illustration 305 provides a graphical representation of what is occurring in connection with each of the lines 2-10. In particular, each query, or request, from lines 2-10 may comprise an application programming interface (API) call to the graph database system to traverse a graph database, and compile and return results associated with a set of starting vertices (e.g., 1000 vertices per page).

In one example, the API of the graph database system accepts resultSize and resultIndex as query parameters. The resultSize is an integer passed in by the client as a query parameter that specifies what amount of results should be returned. The resultIndex is an integer that is passed in by a client as a query parameter that specifies which page/chunk the client wants back. For example, for a resultSize of 10 an index of 1 would return 1-10, an index of 2 would return 11-20, etc. For instance, each GET query in lines 2-10 specifies a resultIndex (e.g., the page/chunk number) and a result size (the number of starting vertices for the page/chunk). In this example, the page/chunk size is 1000. Since the total number of relevant vertices is 8983, there are total of 9 pages/chunks. As can be seen in lines 2-10, each query for paginated results takes between 878 and 1029 ms to complete and returns 1000 results (except for the query of line 10 requesting the last page (page 9), which returns the last 983 results out of a total of 8983).

In one example, each page of results is returned to the client with additional information in the header such as shown in box 310. For instance, the header may include the result index (e.g., the page number) for the current results being returned as well as the result size (e.g., the page size, in terms of the number of starting vertices). These are the same parameters passed in by the client in the query of line 9. For instance, the header of box 310 may be for the $8^{th}$ page being requested in line 9. In one example, the header may also include the total number of pages and the total number of results. This may assist the client in requesting additional pages and/or requesting pages having a different size.

It should be noted that in some examples, a GUI or other application interfaces of the client may be configured to simply proceed from one page to the next until reaching the last page/end of the results. In such case, the header may include a flag to indicate whether the last page is reached. Alternatively, or in addition, the client may compare the result index to the total pages and may determine that the last page is reached when there is a match between these values.

To summarize, in order for pagination to work properly, the order should remain consistent. The way this is achieved is that the vertices are pre-sorted on disk by vertex ID (done by default when new vertices are added to the graph database). When a call is made to retrieve all vertices, a list is generated sorted by vertex ID (since the vertices are indexed this is very quick). The graph database system may then take a sublist of these vertices based on the pagination parameters (in response to a client query/request) and gather all information associated to each vertex in the sublist (this step and the network transfer of less data is where the time/resources is saved).

Figure 4:
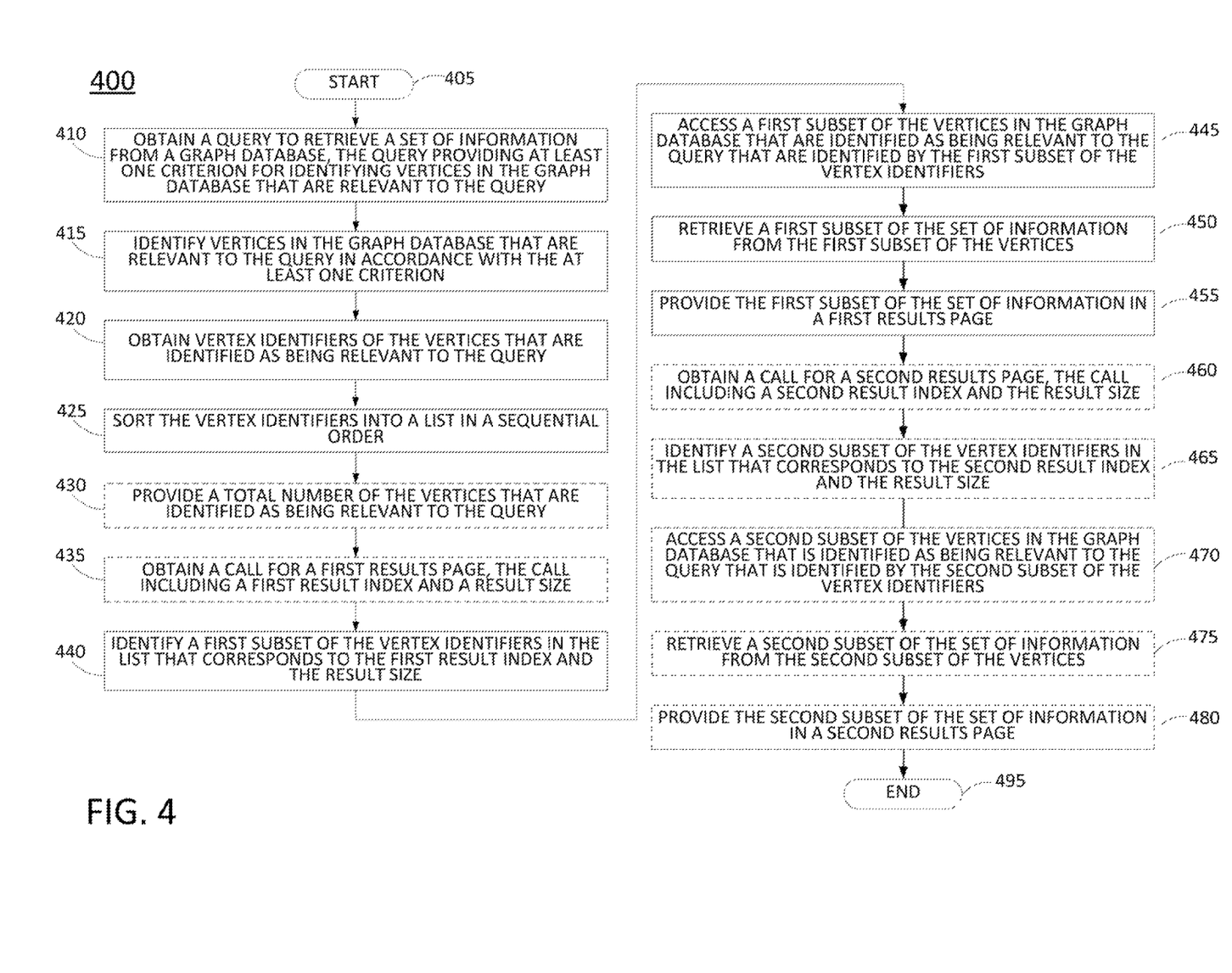
FIG. 4 illustrates a flowchart of an example method for providing paginated results for a graph database query.

FIG. 4 illustrates a flowchart of an example method 400 for providing paginated results for a graph database query, in accordance with the present disclosure. In one example, the method 400 is performed by a graph database system (e.g., the A&AI system 150 of FIG. 1), or by one or more components thereof, (e.g., a processor, or processors, performing operations stored in and loaded from a memory), or by a graph database system in conjunction with one or more other components, such as A&AI system 150 in conjunction with a client device (e.g., SDN controller 150, one of user devices 141 or 143, and so forth). In one example, the steps, functions, or operations of method 400 may be performed by a computing device or system 500, and/or processor 502 as described in connection with FIG. 5 below. For instance, the computing device or system 500 may represent any one or more components of the system 100 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and proceeds to step 410.

At step 410, the processing system obtains a query to retrieve a set of information from a graph database, wherein the query provides at least one criterion for identifying vertices in the graph database that are relevant to the query. In one example, the query identifies at least one attribute. In one example, the query further identifies at least one relationship. For instance, the graph database may comprise an active and available inventory (A&AI) database of a telecommunication network. In such an example, the query may indicate that the client seeks the attributes of a cloud region (e.g., a geographic indicator, a health status indicator, etc.), the rack tenants, physical servers, and VMs/VNFs deployed in and/or operating in each cloud region, the statuses of these components, the relationships between these components (e.g., a particular vMME is deployed in a particular server and is supporting a set of vSGWs which are deployed at other physical servers), and so forth. For instance, the vertices in the graph database may represent physical infrastructure and logical resources of the telecommunication network. In addition, the graph database may be arranged in a hierarchy that includes cloud regions, rack tenants, servers, and virtual machines at respective levels in the hierarchy. Thus, for example, the query may seek information regarding rack tenants in a cloud region, all physical servers for each cloud region, and the VMs/VNFs instantiated thereon. Thus, the query may specify a number of levels and/or edges to traverse from each starting vertex (e.g., from each vertex for a rack tenant). In one example, the graph database may comprise a tree structure. However, in another example, the graph database may have a non-tree structure, may include multiple edges connecting nodes and defining more than one relationship, may be directed or undirected, may or may not include loops, and so forth.

In one example, the query includes a result size. In one example, the query also includes a first result index. For instance, a client device may specify to the processing system, at the time of the query, a first page of results that should be returned (identified by the first result index) as well as the page size (or "result size"). In one example, the query is obtained via a graphical user interface (GUI) of a client device. For instance, the client device may comprise a user device as described above in connection with the example of FIG. 1. However, in another example, the client device may comprise an automated device and/or system (such as an SDN controller, a network billing system, a network security system, etc.).

At step 415, the processing system identifies the vertices in the graph database that are relevant to the query in accordance with the at least one criterion. For instance, the at least one criterion may comprise a vertex type, or label, such as "physical server," "VNF," "cloud region," etc. The at least one criterion may also include a region. For instance, there may be two criteria specifying: "physical servers" in "cloud region 12." In such case, the starting vertices that are relevant to the query may comprise the vertices for physical servers in cloud region 12.

At step 420, the processing system obtains vertex identifiers of the vertices that are identified as being relevant to the query. For instance, when a current last vertex is added to the graph database, the current last vertex is assigned a vertex identifier (ID) that is next in a sequence of vertex IDs following a vertex IDs that is assigned to a penultimate vertex that is added to the graph database. In other words, vertex IDs are assigned sequentially when new vertices are added to the graph database. Note that the vertex IDs are assigned sequentially for new vertices without regard to the type of vertex. In one example, steps 415 and 420 may comprise an initial traversal of the graph database to identify the vertex IDs of the relevant vertices. Further traversals from the starting vertices to obtain attributes and/or relationships in accordance with the query are not performed at this time.

At step 425, the processing system sorts the vertex IDs of the relevant vertices into a list in a sequential order. For example, as described above, vertex IDs are assigned sequentially for new vertices without regard to the type of vertex. Thus, step 420 may return a list of vertex IDs that are not in order (e.g., note ascending or descending). Thus, step 425 may rearrange the list of vertex IDs sequentially.

At optional step 430, the processing system may provide a total number of the vertices that are identified as being relevant to the query. For instance, the processing system may indicate to the client device the total number of vertices, allowing the client device (and/or a user thereof) to consider whether and how to request paginated results.

At optional step 435, the processing system may obtain a call for a first results page, the call including a first result index and a result size. For instance, optional step 435 may be performed in an example where the result size and/or the result index is not specified in connection with the query received at step 410, or where it is not implied that the client desires the first page of results in response to the query itself.

In one example, a GUI of the client device may present a button for selecting the first results page. For instance, in an example where the results page(s) are not immediately returned, information about the total number of vertices may first be returned at optional step 430. Then the first page, second page, etc. may be requested individually by the client device, e.g., by a user via a GUI and/or automatically where the client device comprises an automated device or system.

At step 440, the processing system identifies a first subset of the vertex IDs in the list that correspond to a first result index and a result size. It should be noted that "first" may be the result index "1," but could be another that is not the first sequentially (e.g., the result index could be "5" corresponding to the fifth results page). Thus, it should also be noted that although the terms, "first," "second," "third," etc., may be used herein, the use of these terms is intended as labels only. Thus, the use of a term such as "third" in one example does not necessarily imply that the example must in every case include a "first" and/or a "second" of a similar item. In other words, the use of the terms "first," "second," "third," and "fourth," does not imply a particular number of those items corresponding to those numerical values. In addition, the use of the term "third" for example, does not imply a specific sequence or temporal relationship with respect to a "first" and/or a "second" of a particular type of item, unless otherwise indicated.

Accordingly, in one example, the first result index may comprise a first sequential result index of a plurality of result indices, wherein each result index of the plurality of result indices is associated with a different results page of a plurality of results pages. For example, the processing system may obtain the query at step 410 and provide the first page of results (or another specific page of results) in one pass (e.g., without performing optional steps 430 and 435). In another example, an initial pass retrieves the vertex IDs of the relevant vertices (steps 410-425), and then one or more additional calls are made by the client device to get the data for each page that is desired, where the one or more additional calls define the page size and the particular page to obtain (e.g., optional step 435).

At step 445, the processing system accesses a first subset of the vertices in the graph database that are identified as being relevant to the query and that are identified by the first subset of the vertex IDs. For instance, the processing system may proceed to the first subset of the vertices as starting vertices for retrieving the desired information (attributes and/or relationships).

At step 450, the processing system retrieves a first subset of the set of information from the first subset of the vertices. For example, step 450 may comprise traversing the graph database from each of vertex of the first subset of vertices in accordance with at least one parameter of the query. In one example, the traversing includes, for each vertex of the first subset of vertices: accessing at least one additional vertex via a connecting edge, and retrieving at least a portion of the first subset of the set of information from the at least one additional vertex.

As mentioned above, in one example, the query identifies at least one attribute. For instance, attributes of a cloud region may include a geographic indicator, a health status indicator, etc. Attributes of rack tenants, physical servers, and VMs/VNFs deployed in and/or operating in each cloud region may include the statuses of these components, the locations of these components, the vendor of such components, the number of client served by such components, and so forth.

In one example, the query further identifies at least one relationship. For instance, the relationships between the above-described network components may be indicated by edges in the graph database, and relationship tags or indicators appended to such edges. For instance, an edge and its relationship tag may indicate that a particular vMME is deployed on a particular server. Other edges connecting to the vertex for the vMME may indicate that the vMME supports a set of vSGWs, which are represented by other vertices in the graph database connected to these edges, and so forth. Thus, the processing system may traverse through the graph database from the starting vertices/nodes along various edges in accordance with the query. However, in another example, the query may seek vertex/node attributes only, and may not call for further traversals of the graph database from the starting vertices.

At step 455, the processing system provides the first subset of the set of information in a first results page. For instance, in one example, the first subset of the set of information is presented in the first results page via a GUI of the client device. In another example, the processing system provides the first subset of the set of information in a first results page to a client comprising an automated device or system, which may then utilize the information in any number of ways, such as an SDN controller instantiating, decommissioning, or reconfiguring one or more VMs/VNFs, a network security system reconfiguring a firewall or redirecting traffic, and so on.

At optional step 460, the processing system may obtain a call for a second results page, the call including a second result index and the result size. For example, optional step 460 may comprise the same or similar operations as described above in connection with optional step 435. It should be noted that the "second" result index may be the result index "2", but could be one that is not the second sequentially (e.g., it could be the result index "5" corresponding to the fifth results page). In addition, "second" may be the next result index sequentially following the "first" result index described above, but need not be (e.g., the "first" could be a result index "1" or some other result index (e.g., 3, 4, etc.) and the "second" could be another result index (e.g., 7, 9, etc.)). In one example, the GUI of the client device may present at least one button for requesting at least one additional results page.

At optional step 465, the processing system may identify a second subset of the vertex identifiers in the list that correspond to the second result index and the result size. For instance, if the result size is 1000 and the second result index is "2," the processing system may identify the vertex IDs in positions 1001-2000 from the list.

At optional step 470, the processing system may access a second subset of the vertices in the graph database that are identified as being relevant to the query and that are identified by the second subset of the vertex IDs. For example, optional step 470 may comprise the same or similar operations as described above in connection with step 445.

At optional step 475, the processing system may retrieve a second subset of the set of information from the second subset of the vertices. For example, optional step 475 may comprise the same or similar operations as described above in connection with step 450.

At optional step 480, the processing system may provide the second subset of the set of information in a second results page. For example, optional step 480 may comprise the same or similar operations as described above in connection with step 455.

Following step 455, or any one or more of optional steps 460-480, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processing system may repeat one or more steps of the method 400, such as steps 460-480 to obtain additional result pages, or steps 410-480 (e.g., in connection with a different query), and so forth. In another example, steps 420 and 425 may simply retrieve a pre-sorted list, or index. For instance, the processing system (such as an A&AI database system) may maintain an index of physical servers, an index of cloud regions, etc. Thus, for example, if the query relates to cloud regions as the starting vertices, the processing system may skip a traversal of the graph database to pull the vertex IDs for the cloud regions as starting vertices, since a list has already been compiled (perhaps for another purpose). In addition, the list/index may already be arranged in a sequential order by vertex ID, thus rendering step 425 unnecessary. Alternatively, or in addition, the operations of steps 420 and 425 may be performed prior to obtaining the query at step 410. For instance, the method 400 may include pre-compiling a list of relevant vertex IDs, e.g., in anticipation of the query and/or being performed for another purpose unrelated to the specific client query received at step 410. Thus, these and other modifications are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1 or described in connection with the method 400 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for providing paginated results for a graph database query, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for providing paginated results for a graph database query (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for providing paginated results for a graph database query (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, a query to retrieve a set of information from a graph database, wherein the query provides at least one criterion for identifying vertices in the graph database that are relevant to the query;
    identifying, by the processing system, the vertices in the graph database that are relevant to the query in accordance with the at least one criterion;
    obtaining, by the processing system, vertex identifiers of the vertices that are identified as being relevant to the query, wherein when a current last vertex is added to the graph database, the current last vertex is assigned a vertex identifier that is next in a sequence of vertex identifiers following a vertex identifier that is assigned to a penultimate vertex that is added to the graph database;
    sorting, by the processing system, the vertex identifiers into a list in a sequential order, wherein the list is ordered based on the vertex identifiers;
    identifying, by the processing system, a first subset of the vertex identifiers in the list that corresponds to a first result index and a result size;
    accessing, by the processing system, a first subset of the vertices in the graph database that is identified as being relevant to the query and that is identified by the first subset of the vertex identifiers;
    retrieving, by the processing system, a first subset of the set of information from the first subset of the vertices; and
    providing, by the processing system, the first subset of the set of information in a first results page.

2. The method of claim 1, wherein the retrieving the first subset of the set of information from the first subset of the vertices comprises:
    traversing the graph database from each vertex of the first subset of vertices in accordance with at least one parameter of the query.

3. The method of claim 2, wherein the traversing includes, for each vertex of the first subset of vertices:
    accessing at least one additional vertex via a connecting edge; and
    retrieving at least a portion of the first subset of the set of information from the at least one additional vertex.

4. The method of claim 1, wherein the query includes the result size.

5. The method of claim 4, wherein the query further includes the first result index.

6. The method of claim 4, wherein the first result index comprises a first sequential result index of a plurality of result indices, wherein each result index of the plurality of result indices is associated with a different results page of a plurality of results pages.

7. The method of claim 1, further comprising:
    obtaining a call for the first results page, the call including the first result index and the result size.

8. The method of claim 1, further comprising:
    providing a total number of the vertices that are identified as being relevant to the query.

9. The method of claim 1, further comprising:
    obtaining a call for a second results page, the call including a second result index and the result size.

10. The method of claim 9, further comprising:
    identifying a second subset of the vertex identifiers in the list that corresponds to the second result index and the result size;
    accessing a second subset of the vertices in the graph database that is identified as being relevant to the query that is identified by the second subset of the vertex identifiers;

retrieving a second subset of the set of information from the second subset of the vertices; and providing the second subset of the set of information in the second results page.

11. The method of claim 1, wherein the graph database comprises an active and available inventory database of a telecommunication network.

12. The method of claim 11, wherein the vertices in the graph database represent physical infrastructure and logical resources of the telecommunication network.

13. The method of claim 11, wherein the vertices in the graph database are arranged in a hierarchy that includes cloud regions, rack tenants, servers, and virtual machines at respective levels in the hierarchy.

14. The method of claim 1, wherein the graph database comprises a tree structure.

15. The method of claim 1, wherein the query is obtained via a graphical user interface of a client device.

16. The method of claim 15, wherein the first subset of the set of information is presented in the first results page via the graphical user interface of the client device.

17. The method of claim 15, wherein the graphical user interface presents at least one button for requesting at least one additional results page.

18. An apparatus comprising:
a processing system including at least one processor; and
a computer-readable medium storing instructions which, when executed by the processing system, cause the processing system to perform operations, the operations comprising:
obtaining a query to retrieve a set of information from a graph database, wherein the query provides at least one criterion for identifying vertices in the graph database that are relevant to the query;
identifying the vertices in the graph database that are relevant to the query in accordance with the at least one criterion;
obtaining vertex identifiers of the vertices that are identified as being relevant to the query, wherein when a current last vertex is added to the graph database, the current last vertex is assigned a vertex identifier that is next in a sequence of vertex identifiers following a vertex identifier that is assigned to a penultimate vertex that is added to the graph database;
sorting the vertex identifiers into a list in a sequential order, wherein the list is ordered based on the vertex identifiers;
identifying a first subset of the vertex identifiers in the list that corresponds to a first result index and a result size;
accessing a first subset of the vertices in the graph database that is identified as being relevant to the query and that is identified by the first subset of the vertex identifiers;
retrieving a first subset of the set of information from the first subset of the vertices; and
providing the first subset of the set of information in a first results page.

19. A non-transitory computer-readable medium storing instructions which, when executed by a processing system including at least one processor, cause the processing system to perform operations, the operations comprising:
obtaining a query to retrieve a set of information from a graph database, wherein the query provides at least one criterion for identifying vertices in the graph database that are relevant to the query;
identifying the vertices in the graph database that are relevant to the query in accordance with the at least one criterion;
obtaining vertex identifiers of the vertices that are identified as being relevant to the query, wherein when a current last vertex is added to the graph database, the current last vertex is assigned a vertex identifier that is next in a sequence of vertex identifiers following a vertex identifier that is assigned to a penultimate vertex that is added to the graph database;
sorting the vertex identifiers into a list in a sequential order, wherein the list is ordered based on the vertex identifiers;
identifying a first subset of the vertex identifiers in the list that corresponds to a first result index and a result size;
accessing a first subset of the vertices in the graph database that is identified as being relevant to the query and that is identified by the first subset of the vertex identifiers;
retrieving a first subset of the set of information from the first subset of the vertices; and
providing the first subset of the set of information in a first results page.

20. The non-transitory computer-readable medium of claim 19, wherein the retrieving the first subset of the set of information from the first subset of the vertices comprises:
traversing the graph database from each of vertex of the first subset of vertices in accordance with at least one parameter of the query.

* * * * *